United States Patent
Lindlar et al.

(10) Patent No.: US 7,149,473 B1
(45) Date of Patent: Dec. 12, 2006

(54) INTERFACE

(75) Inventors: Heribert Lindlar, Bochum (DE); Markus Schetelig, Essen (DE); Paul Burgess, Bochum (DE); Olaf Joeressen, Dusseldorf (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/889,232

(22) PCT Filed: Jan. 14, 2000

(86) PCT No.: PCT/GB00/00161

§ 371 (c)(1),
(2), (4) Date: Nov. 28, 2001

(87) PCT Pub. No.: WO00/42744

PCT Pub. Date: Jul. 20, 2000

(30) Foreign Application Priority Data

| Jan. 15, 1999 | (GB) | ................................. 9900829.4 |
| Dec. 3, 1999 | (GB) | ................................. 9928574.4 |
| Dec. 7, 1999 | (GB) | ................................. 9928856.5 |
| Jul. 2, 2001 | (GB) | ................................. 0116140.5 |

(51) Int. Cl.
*H04B 5/00* (2006.01)
*H04B 7/24* (2006.01)

(52) U.S. Cl. ...................... 455/41.1; 455/39

(58) Field of Classification Search ................. 455/39, 455/40, 41.1, 277.1
See application file for complete search history.

(56) References Cited

U.S. PATENT DOCUMENTS

| 5,408,698 | A | * | 4/1995 | Serizawa et al. ........ 455/245.1 |
| 5,559,501 | A | * | 9/1996 | Barzegar et al. ............ 340/825 |
| 5,636,140 | A | * | 6/1997 | Lee et al. .................... 370/469 |
| 5,937,018 | A | * | 8/1999 | Golden ........................ 375/347 |
| 6,278,864 | B1 | * | 8/2001 | Cummins et al. ............. 455/73 |
| 6,792,256 | B1 | * | 9/2004 | Kinney et al. ............ 455/277.1 |

* cited by examiner

*Primary Examiner*—William J. Deane, Jr.
(74) *Attorney, Agent, or Firm*—Banner & Witcoff (57) ABSTRACT

An interface between base band circuitry and RF transceiver circuitry, particularly relating to the Bluetooth standard. The interface has a plurality of connectors (DBus) for controlling the RF transceiver circuitry including providing control information for changing the mode of operation of the transceiver, said modes including a transmit mode and a receive mode; at least first and second further connectors (RFBus) wherein in the transmit mode, one of said first and second connectors supplies data to the transceiver and the other is operable to perform a first function such as controlling the power amplifier in the RF circuitry and wherein, in the receive mode, one of said first and second connectors receives data from said RF module and the other is operable to perform a second function different from the first function.

24 Claims, 7 Drawing Sheets

TABLE 1:
SUMMARY OF THE INTERFACE SIGNALS

| PIN | NAME | DIRECTION | FUNCTION |
|---|---|---|---|
| 20 | DBusDa | BIDIRECTIONAL | CONTROL INTERFACE: DATA |
| 24 | DBusClk | BB -> RF | CONTROL INTERFACE: CLOCK |
| 22 | DBusEnX | BB -> RF | CONTROL INTERFACE: ENABLE |
| 40 | RFBus1 | BIDIRECTIONAL | DATA INTERFACE: LINE 1 |
| 42 | RFBus2 | BB -> RF | DATA INTERFACE: LINE 2 |
| 44 | BBCLK | RF -> BB | DATA INTERFACE: CLOCK (e.g. 13 MHz) |
| 30 | SleepX | BB -> RF | SLEEP-MODE CONTROL & REST |

TABLE 2:
OPERATING MODES AND THEIR INFLUENCE ON THE DATA INTERFACE

| MODE NAME | FUNCTIONALITY OF RFBUS1 | FUNCTIONALITY OF RFBUS2 | DIRECTION OF RFBUS1 | DIRECTION OF RFBUS2 |
|---|---|---|---|---|
| CONTROL MODE | <CLKON> | 0 | BB → RF | BB → RF |
| TRANSMIT MODE | <TXDATA> | <PAON> | BB → RF | BB → RF |
| RECEIVE MODE | <RXDATA> | <DCTRACK> | BB ← RF | BB → RF |

IN Tx Mode - SWITCHES UP
IN Rx Mode - SWITCHES DOWN

INTERFACE

BACKGROUND OF THE INVENTION

1. Field of the Invention

The present invention relates to an interface between base band circuitry and radio frequency transceiver circuitry, particularly circuitry operating in accordance with the Bluetooth Low Power Radio Frequency Specification. It additionally relates to devices having such an interface and either type of circuitry.

2. Description of the Prior Art

Low power radio frequency systems allow communication between devices over short distances typically ten's of meters. The devices must each be capable of receiving and transmitting according to the system's protocol.

One low power radio frequency system is the Bluetooth system. This system is designed to replace connecting wires and cables with wireless connectivity. For one device to communicate with another device, no wires connecting them will be necessary. Instead, each device will host a transceiver. A transceiver has a baseband part and an RF part. The host itself may have processing circuitry which is capable of doing the base band processing and that host will only require RF transceiver circuitry to be correctly connected to that processing circuitry.

SUMMARY OF THE INVENTION

It would be desirable to create RF transceiver circuitry that can be connected to many different hosts to provide the hosts with wireless connectivity.

It would be desirable to standardize the interface at which the connection between the base band circuitry and the transceiver circuitry is made making it vendor and platform independent.

It would be desirable to have a simple interface between the baseband part and the radio frequency part and in particular to have a reduced number of pins in the interface. A reduced number of pins provides the advantages of reduced chip area and reduced power consumption due to less toggling of pins.

Embodiments of the present invention therefore provide an interface with a low pin count and attendant low power consumption.

The low pin count arises out of: the burst mode controller and the microcontroller both using the DBus; the burst mode controller using the DBus for different tasks and the function of the RFBus being dependent upon the operational mode.

The burst mode controller controls time critical tasks in the RF circuitry using the DBus and RFBus. The DBus is used to control time critical configurations. The RFBus is used to transfer data and, in the transmit mode, to control the power amplifier.

BRIEF DESCRIPTION OF THE DRAWINGS

For a better understanding of the present invention and to understand how the same may be brought into effect reference will now be made, by way of example only, to the accompanying tables and figures in which.

Table 1 illustrates the signals provided at the interface between Baseband (BB) circuitry and Radio Frequency (RF) circuitry.

Table 2 illustrates the effect of operational modes on the signals provided at the interface via RFBus.

DESCRIPTION OF THE PREFERRED EMBODIMENTS

Figure 1A:
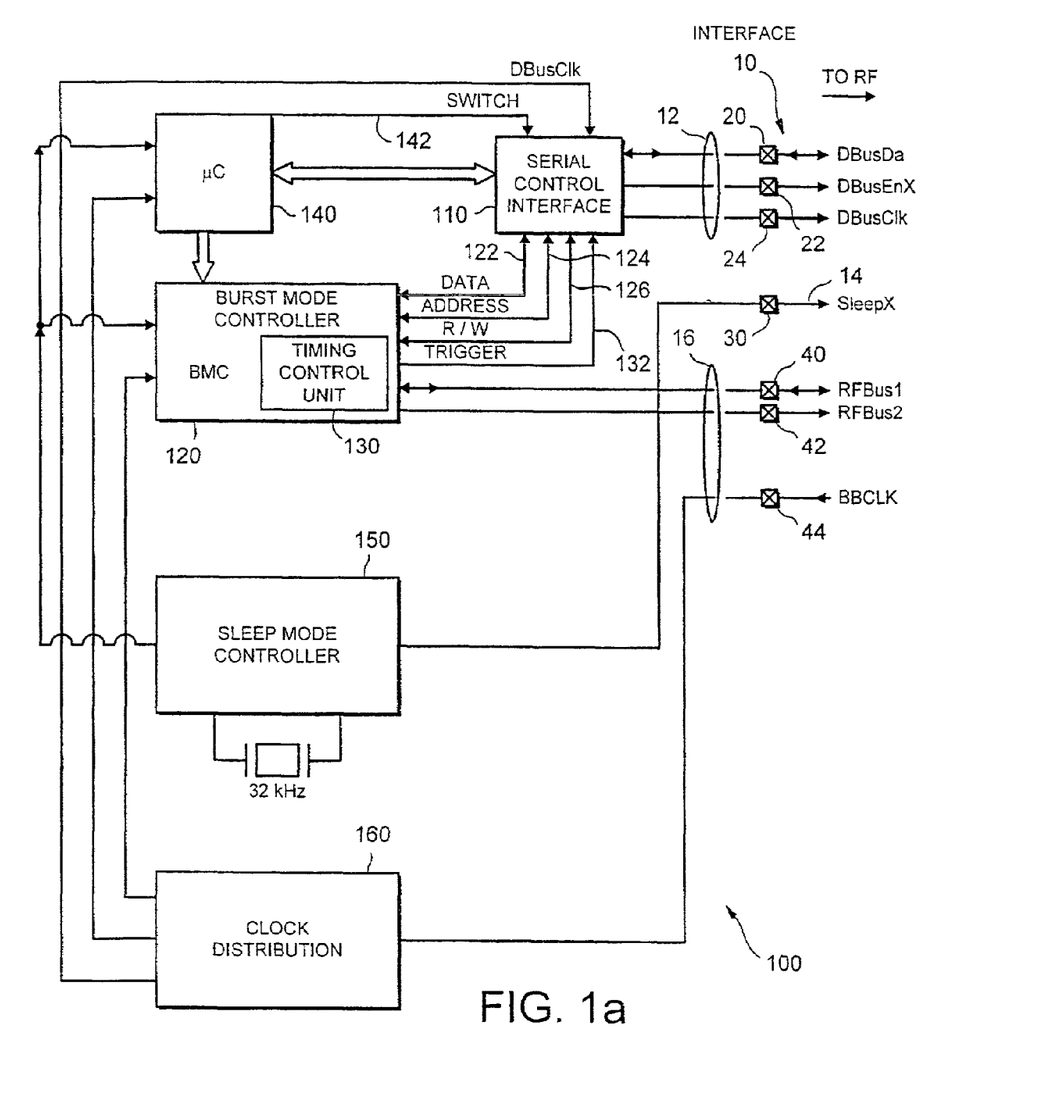
FIG. 1*a* illustrates the BB side of the RF-BB interface.

FIG. 1*a* illustrates baseband (BB) circuitry 100 having an interface 10. The interface is connected or connectable to a similar corresponding interface 10 of radio frequency (RF) circuitry 200 illustrated in FIG. 1*b*.

Figure 1B:
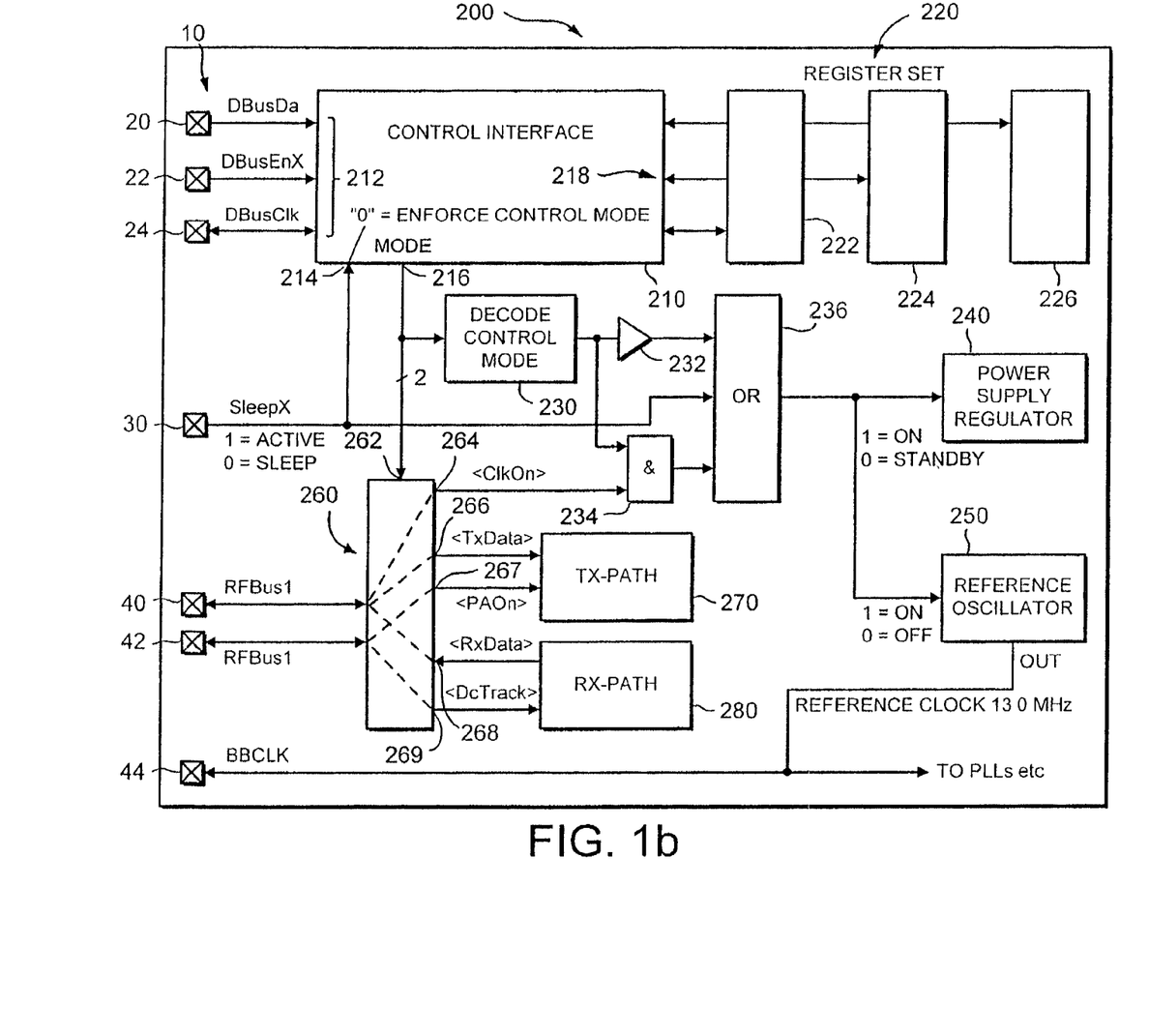
FIG. 1*b* illustrates the RF side of the RF-BB interface.

The interface 10 has seven connectors, which are pins in this embodiment. The pins 20, 22 and 24 are assigned to the bus of control signals DBus 12 and respectively transfer the signals DBusDa, DBusEnX and DBusClk. The pin 30 is assigned to the sleep control signal SleepX 14. The pins 40, 42 and 44 are assigned to the bus of data signals RFBus 16 and respectively transfer the signals RFBus1, RFBus2 and BBClk. The pins of the interface 10 in the BB circuitry connect or are connectable to corresponding pins of the interface 10 of the RF circuitry 200.

The pins of the interface 10 in the BB circuitry connect or are connectable to corresponding pins of the interface 10 of the RF circuitry 200.

The DBus 12 has three signal lines associated with the pins 20, 22 and 24. A bi-directional signal line for transferring data signal DBusDa either from BB circuitry 100 to RF circuitry 200 or from RF circuitry 200 to BB circuitry 100, via pin 20. A unidirectional signal line is for transferring an enable signal DBusEnX from the BB circuitry 100 to RF circuitry 200, via pin 22. A unidirectional signal line is for transferring a clock signal DBusClk from the BB circuitry 100 to RF circuitry 200, via pin 24.

The RFBus 16 has three signal lines associated with the pins 40, 42 and 44. A bi-directional signal line is for transferring signal RFBus1 via pin 40. A unidirectional signal line is for transferring a clock signal BBCLK from the RF circuitry 200 to BB circuitry 100 via pin 44. A unidirectional signal line is for transferring signal RFBus2 from BB circuitry 100 to RF circuitry 200 via pin 42.

SleepX 14 is a unidirectional signal line for transferring from the BB circuitry 100 a signal SleepX for controlling power-down in the RF circuitry 200.

Table 1 illustrates the signals provided at the interface 10 and identifies each one of the interface signals by their associated interface pin, their name, their direction and their function.

DBus

Figure 3:
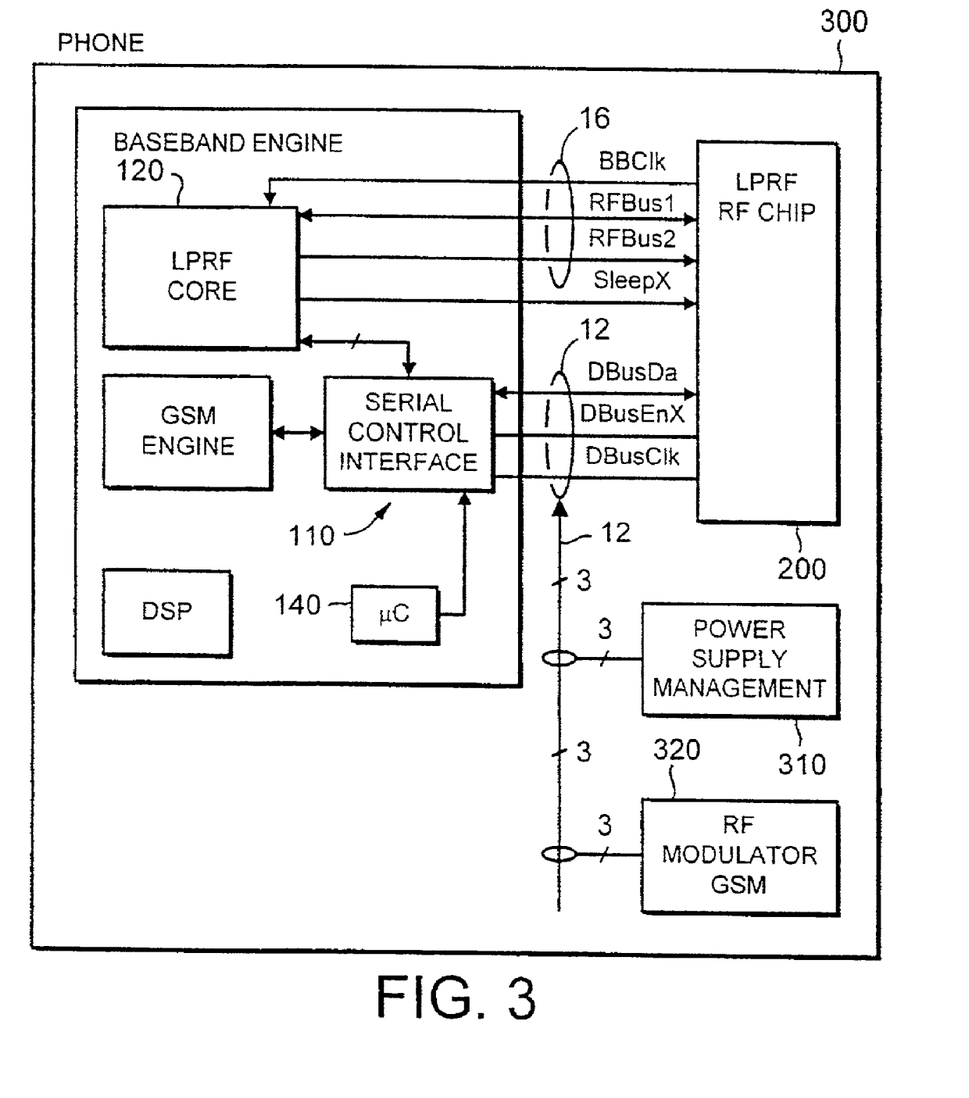
FIG. 3 illustrates how the DBus may control devices in addition to an LPRF RF chip having RF circuitry.

DBus 12 is a serial I/O Data Bus. It is a Clock, Data, Enable serial interface. It is not dedicated purely to the interface 10 between the RF circuitry 200 and the BB circuitry 200. FIG. 3, illustrates the situation in which the BB circuitry 100 is integrated into another host system. The BB circuitry 100 is the DBus Master. In this example the host system is a radio telephone 300, but it could be a computer or personal digital assistant (PDA). The DBus 12 communicates with DBus Slaves. One DBus Slave is the RF circuitry 200 which is connected to DBus via the interface 10. Other slaves communicated with are in the example illustrated Power Supply Management Circuitry 310 and RF Modulator Circuitry 320 for the GSM protocol.

Figure 4A:
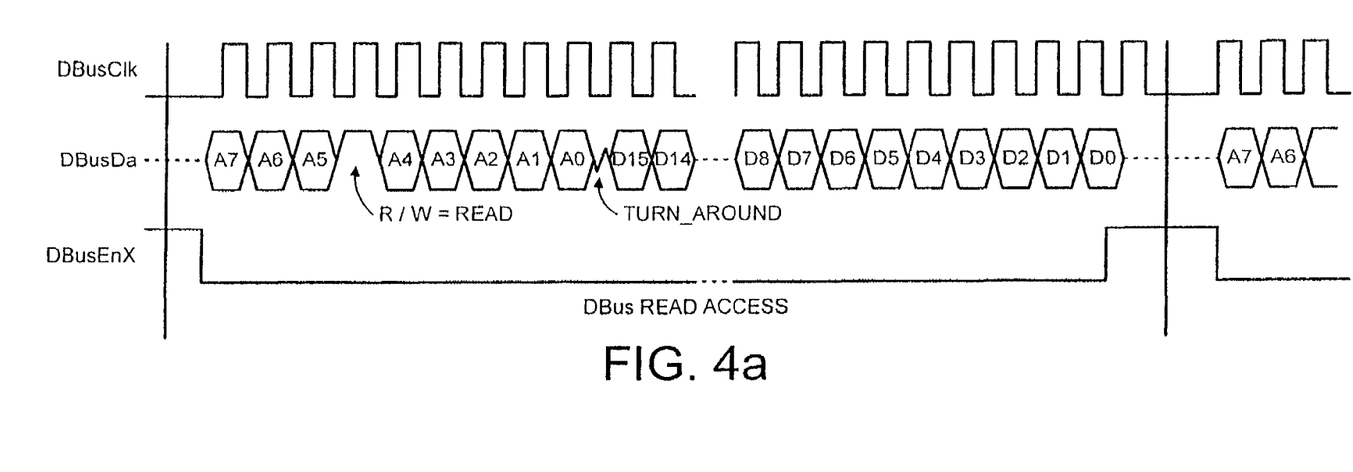
FIG. 4*a* illustrates Write Access on DBus
Figure 4B:
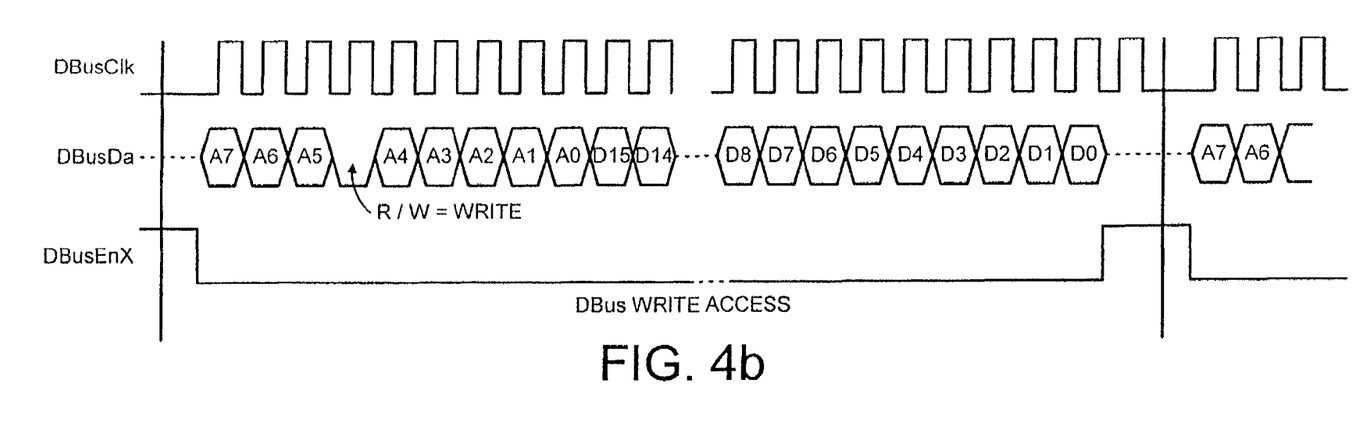
FIG. 4*b* illustrates Read Access on DBus.

The DBus (DBusDa, DBusEnX and DBusClk) is used to control the RF circuitry and other devices as illustrated in FIG. 4. The DBus writes control data to and reads control data from registers in the RF circuitry 200. The registers written to may include a register which controls the frequency at which the RF chip transmits or receives, a register which controls the power at which the RF chip transmits and registers which identify whether the RF chip is in the control, transmit or receive mode. The registers read from may include a register containing RSSI information. Thus the DBus may control the operation of the RF circuitry, for example, controlling the transition from receiving to transmitting.

The BB circuitry 100 controls access to the DBus. The BB circuitry precedes transferred data words with a device address, a Read/Write (R/W) identification bit and a register address. Each device address is 3 bits long allowing for 8 devices (the RF circuitry 200 and 7 others) to be accessed. The R/W bit when LOW indicates the BB circuitry is to write to the addressed register and when HIGH indicates that the BB circuitry is to read from the addressed register. The register address is 5 bits long allowing 32 registers to be addressed. The data words may be of variable length and may have a practical limit of 32 bits. Data words of 16 bits are preferred for transfer to/from the RF circuitry 200.

Address bits and R/W bit are verified before latching data to permit bus sharing with devices which are used concurrently to RF circuitry 200.

Access via DBus is enabled by taking DBusEnX at a LOW half of a clock cycle before the first positive clock edge of DBusClk. At the first rising edge of DBusClk the MSB of the device address will be clocked from DBusDa into the DBus Slave.

A write access is illustrated in FIG. 4b. To write to RF circuitry 200, the DBus Master circuitry 100 places data onto DBusDa at the falling edge of DBusClk. The DBus Slave 200 having verified that it is addressed takes data from DBusDa on each of the rising edges of DBusClk. The DBus Master 100 changes the state of data at the falling edge of each clock pulse of DBusClk. Following the 8 address bits and R/W bit, data bits are sent with the same timing as the address bits. Following the last data bit the enable line DBusEnX is taken HIGH. The clock then pulses one more pulse and is then held LOW for a minimum of one cycle before a new access may be started. The enable DBusEnX is therefore held HIGH for a minimum of two cycles.

A read access is illustrated in FIG. 4a. The DBus Slave when being read from, places data onto DBusDa on each of the rising edges of DBusClk. The data is read from DBusDa by the DBus Master 100 on each of the falling edge of DBusClk. During a read access the addressed device generates data on the DBus to be read by the controlling device. Following the 8 address bits and R/W bit there is a turn around bit which lasts for half a clock cycle and has the effect of realigning the DBus timing such that the addressed device will load bits onto the DBus upon the rising edge of the DBusClk. The bits are read at the DBus Master 100 on the falling edges of the DBusClk. Following the last data bit, the DBusClk is disabled for at least one clock cycle before the next access. The data word length is not fixed. The DBus Master 100 controls DBusEnX. The number of data bits and the data word length is fixed for a certain address by convention.

RFBus

The interface 10 has a dedicated pin for signal RFBus1, a dedicated pin for signal RFBus2; and a dedicated pin for clock signal BBClk (13 MHz), used to synchronize data transferred via RFBus. BBClk may also be used for clocking logic of BB circuitry 100. BBClk is generated by RF circuitry 200 at 13 MHz for symbol rate of 1 Mbaud @ 13 fold oversampling.

The RFBus 16 is multifunctional. The RFBus is used for transferring received data from the RF circuitry 200 to the BB circuitry 100, transferring data for transmission from the BB circuitry 100 to the RF circuitry 200 and transferring control data between the BB circuitry 100 and RF circuitry 200. The ability of the RFBus to transfer control data is used for different purposes depending upon the operational mode of the system.

The RFBus 1 is bidirectional. In a Transmit mode the RFBus 1 provides data to the RF circuitry 200 for transmission. In a Receive Mode RFBus 2 receives data from the RF circuitry 200. Although in the examples given a single data signal RFBus1 is illustrated, a plurality of such data signals may be used to increase bandwidth.

The RFBus 2 is used to control time critical tasks in the RF circuitry 200. Time critical tasks are tasks which need to be effected on a time scale of less than 1 bit width (1 µs in Bluetooth). The RFBus2 is fast (13 MHz) at transmitting control signals from the BB circuitry 100 to the RF circuitry 200. In the Transmit mode, RFBus2 is used to control the timing of the Power Amplifier. In the Receive Mode the RFBus 2 is used to control the timing of the DC estimator changing from a fast data acquisition mode to a slower data acquisition mode.

The operational mode of the system is determined by the BB circuitry 100. The BB circuitry indicates a change of mode to the RF circuitry 200 via DBus. The modes include Transmit Mode, Receive Mode and Control Mode.

Interface of BB Circuitry

The BB circuitry illustrated in FIG. 1a has the interface 10 previously described. It additionally has a Serial Control Interface 110, a Burst Mode Controller (BMC) including a Timing Control Unit 130, a microcontroller 140, a sleep mode controller 150 and clock distribution circuitry (CDC) 160. The Serial Control Interface 110 provides DBus at pins 20, 22 and 24. The Burst Mode Controller 120 provides RFBus1 at pin 40 and RFBus2 at pin 42. The Sleep Mode Controller provides SleepX at pin 30. The Clock Distribution Circuitry (CDC) 160 is connected to pin 44 of interface 10 and receives BBClk from the RF circuitry 200.

The CDC 160 provides clock signals derived from BBClk to the BMC 120, the microcontroller 140 and the Serial Control Interface 110.

The Serial Control Interface 110 is controlled to produce DBus by either the microcontroller 140 or the Burst Mode Controller 120. The Burst Mode Controller controls DBus when time critical configurations to RF circuitry 200 are made. Whether the microcontroller 140 or the BMC 120 controls the content of DBus is determined by a switch signal 142 provided by the microcontroller 140 to the Serial Control Interface 110. The BMC 120 provides Data information 122, address information 124 and R/W information 126 to the Serial Control Interface 110 which places this information in the correct serial format on DBusDa. The clock signal DBusClk (13 MHz) is received from CDC 160.

The timing of the transitions in the Enable signal DBusEnX are controlled by a Trigger signal 132 provided by the Timing Control Unit 130 in the BMC 120.

The Burst Mode Controller 120 controls the content of RFBus1 and RFBus2 and may additionally control the content of DBus. The Burst Mode Controller directly provides RFBus2 to pin 42 and provides RFBus1 to pin 40 in the Transmit Mode and receives RFBus1 from pin 40 in the Receive Mode.

The microcontroller may access the DBus and hence the RF circuitry via the Serial Control Interface. When the DBus is controlled by the microcontroller no time critical tasks can be controlled via the DBus. This configuration is used in the boot phase or for RSSI measurement. When the BMC 120 controls the DBus, it is possible to control time critical tasks via the DBus. The ability of the BMC 120 to control time critical tasks via the DBus depends upon the resolution of the trigger signal 132 which is at least 1 μs. The control signals sent by the BMC 120 via RFBus2 may have an even higher resolution if they are directly clocked by BBClk @ 13 MHz.

Interface of RF Circuitry

FIG. 1b illustrates the RF circuitry 200 which has an interface 10. The interface has pins 20, 22 and 24 dedicated respectively to DBusDa, DBusEnX and DBusClk, pin 30 dedicated to SleepX and pins 40, 42 and 44 respectively dedicated to RFBus1, RFBus2 and BBClk. The RF circuitry 200 includes a Control Interface 210; a register set 220 illustratively including registers 222, 224 and 226; decoding circuitry 230; a NOT gate 232; a two input AND gate 234; a three input OR gate 236; power-supply regulator circuitry 240; a reference oscillator 250; switching circuitry 260; Transmission Path 270 and Reception Path 280.

The Control Interface 210 has an input interface 212 connected to DBus and a input 214 for receiving Sleep X. It has an output 216 for supplying a mode control signal to the input of decoding circuitry 230 and to the control input 262 of the switching circuitry 260 and an interface 218 for accessing the set of registers 220. The Control Interface 210 receives DBus and performs the appropriate action which may involve writing to a register or reading from a register and changing the mode of operation of the RF circuitry 200. By writing to appropriate registers the Control Interface 210 may control the operational mode of the RF circuitry 200, control the synthesizer frequency in the Tx or Rx path, control whether the RF circuitry should receive or transmit, and control the power at which the Tx path 270 should transmit. By reading from appropriate registers, information concerning received signal quality such as RSSI can sent by the Control Interface 210 to the BB circuitry 100. For simplicity of illustration the operative connections of the Rx Path 280 and Tx Path 210 to the register set 220 are not shown. A two bit signal is provided at the output 216 indicating the operational mode—[10] indicates Receive Mode, [01] indicates Transmit Mode and [11] indicates Control Mode.

The switching circuitry 260 has an input 262 connected to output 216 of the Control Interface 210, a single primary interface and three secondary interfaces. The primary interface has one port connected to pin 40 to transfer RFBus1 and another port connected to pin 42 to transfer RFBus2. One of the secondary interfaces is connected at any one time to the primary interface in dependence on the signal received at the input 262. When the signal at input 262 indicates Control Mode, a port 264 of a first one of the secondary interfaces is connected to pin 40 via the switching circuitry 260. The port 264 is connected to one input of the AND gate 234. When the signal at input 262 indicates Transmit Mode, a port 266 of a different one of the secondary interfaces is connected to pin 40 via the switching circuitry 260 and the other port 267 of that secondary interface is connected to pin 42 via the switching circuitry 260. When the signal at input 262 indicates Receive Mode a port 268 of another of the secondary interfaces is connected to pin 40 via the switching circuitry 260 and the other port 269 of that secondary interface is connected to pin 42 via the switching circuitry 260. The ports 266 and 267 and 268 and 269 are connected to the Tx Path 270 and Rx Path 280 respectively as further illustrated in FIG. 1c.

The decoding circuitry 230 has a 2 bit wide input connected to the output 216 of the Control Interface 210 and provides its output to one input of AND gate 234 and, via NOT gate 232, to one input of OR gate 236. The decoding circuitry 230 produces a HIGH output when the signal received at its input identifies the Control Mode and a LOW signal otherwise.

The OR gate receives one input via the NOT gate 232 as described, another input from the pin 30 which receives SleepX and a final input from the output of AND gate 234. The output of the OR gate 236 is provided as a standby control signal to the Power-Supply Regulation Circuitry 240 and to the Reference Oscillator 250. A LOW output from the OR gate 236 places Power-Supply Regulation Circuitry 240 into a low power consumption standby state and switches the Reference Oscillator 250 off.

The Reference Oscillator 250 provides its output to the pin 44. It's output is also used elsewhere within the RF circuitry, but this is not illustrated for purposes of clarity.

Figure 1C:
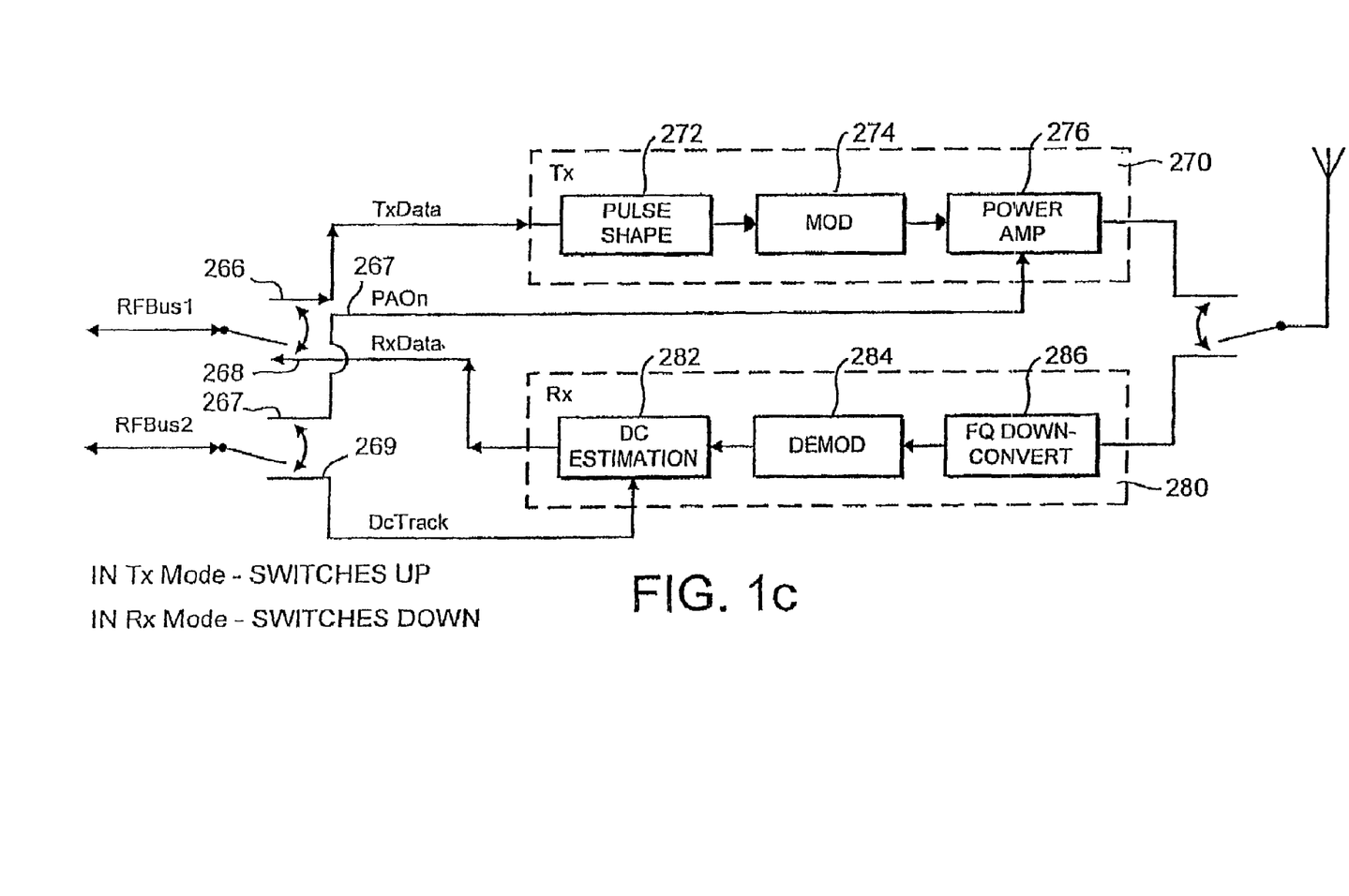
FIG. 1*c* is a schematic illustration of a LPRF transceiver illustrating the functionality of RFBus.

FIG. 1c illustrates the control effected on the Tx path 270 during Transmit Mode and the control effected on the Rx Path 280 during Receive Mode.

The Transmit path 270 includes Pulse Shaping Circuitry 272 which receives an input from port 266 of switching circuitry 260 in the Transmit Mode and otherwise does not receive an input. The output of the Pulse Shaping Circuitry 272 is provided as an input to Modulation Circuitry 274 which provides the modulated signal to Power Amplifier 276 for amplification and subsequent transmission via an antenna. The power Amplifier 276 has a control input by which the amplifier gain may be forced to ramp up or ramp down. This control input is connected to port 267 of the switching circuitry 260. The power amplifier can therefore be switched on or off.

The Receive Path 280 includes Frequency Down Conversion Circuitry 286 which receives an input from the antenna in the Receive Mode. The circuitry 286 converts the received signal to a lower frequency and provides it to Demodulation Circuitry 284. The demodulated signal is provided to DC estimation circuitry 282. The amplitude decided data output by DC Estimation circuitry 282 is supplied to the port 268 of the switching circuitry 260. The DC Estimation Circuitry 282 has a control input connected to the port 269 of switching circuitry 260. The signals provided at the control input determine whether the DC Estimation operates in a fast mode or a slow mode.

Operational Modes

Figure 2A:
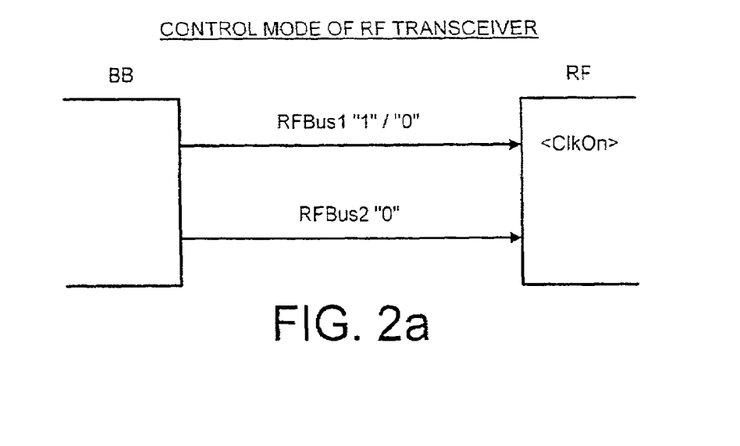
FIG. 2*a* illustrates how the RFBus is configured and how the RF chip responds in the control mode.
Figure 2B:
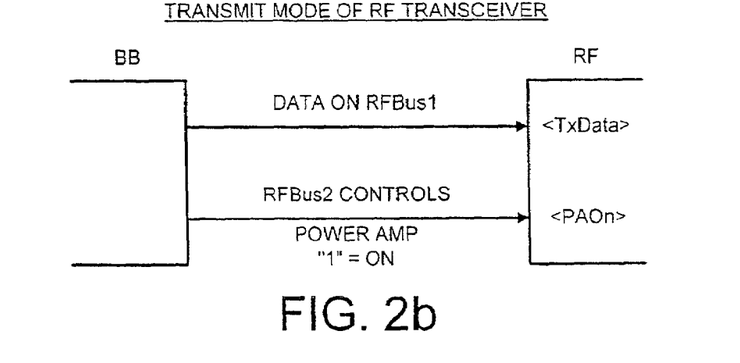
FIG. 2*b* illustrates how the RFBus is configured and how the RF chip responds in the transmit mode.

In the Transmit Mode, as illustrated in FIG. 2b, RFBus1 and RFBus2 are driven by BB circuitry 100. RFBus1 supplies digital data for transmission <TXDATA> from BB circuitry 100 to RF circuitry 200 via pin 40. Logic levels are used and pulse shaping is done completely in RF circuitry 200. RFBus2 controls the timing of powering up the Power Amplifier (PA) in the RF circuitry 200 using control signal <PAON>. When RFBus2=<PAON>=HIGH the Power Amplifier is on when RFBus2=<PAON>=LOW the Power Amplifier is off. The switching on and off of the Power Amplifier is 'time critical' as it must be controlled over time scales of less than 1 bit duration (1 μs for Bluetooth Specification 1.0).

Figure 2C:
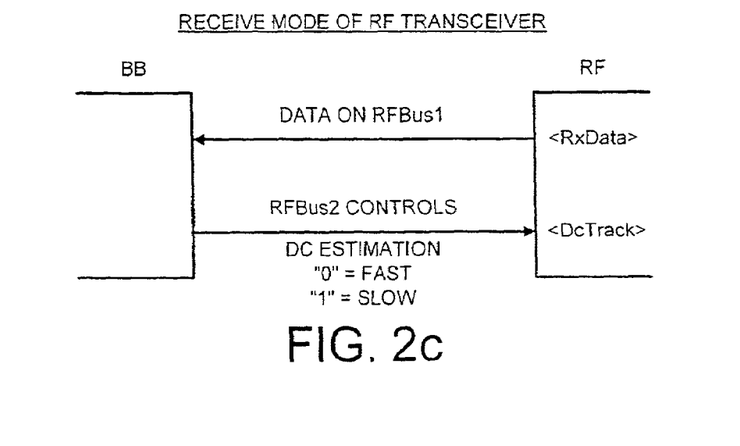
FIG. 2*c* illustrates how the RFBus is configured and how the RF chip responds in the receive mode.

In Receive Mode, as illustrated in FIG. 2c, RFBus1 is driven by RF circuitry 200 and RFBus2 driven by BB circuitry 100. RFBus1 supplies received data <RXDATA> to the BB circuitry 100 via pin 40. RFBus2 controls DC estimation in RF circuitry 200 via pin 42. The switching of DC estimation is 'time critical' as it occurs on a time scale of less than 1 slot duration. <DCTRACK>=LOW cause use of a fast acquisition of a DC estimate which is typically used at the start of a received packet and <DCTRACK>=HIGH controls use of a slower DC estimation which is typically used for the remainder of the packet. The change of DC estimation is 'time critical' as it must be controlled over time scales of less than 1 bit duration (1 μs for Bluetooth Specification 1.0).

The Control Mode is the neutral mode entered when neither the Transmit Mode or Receive Mode are active. It is entered when SleepX is LOW or via a control word on DBus. In this mode, as illustrated in FIG. 2a, RFBus1 and RFBus2 are driven by BB circuitry 100: RFBus2 does not have an assigned functionality; RFBus1=<ClkOn>. When RFBus1=<ClkOn>=HIGH, AND gate 234 switches ON the Reference Oscillator 250 and the Power Supply Regulation Circuitry 240. When RFBus1=<ClkOn>=LOW, AND gate 234 switches OFF the Reference Oscillator 250 and the Power Supply Regulation Circuitry 240 into standby. The RF circuitry is placed in a low power mode. There is no activity on DBus and RFBus and BBClk is switched off.

It will therefore be appreciated that the RFBus is used for different purposes during different operational modes of the system, as illustrated in FIGS. 2a, 2b, and 2c and Table 2.

The operation of a LPRF device is described in detail in UK Patent Application No 9820859.8, the contents of which are hereby incorporated by reference. In particular FIG. 4 shows LPRF RF components of a transceiver (Tx, Rx and Frequency control), connected to baseband components (the remaining elements in the Figure).

In the preceding described embodiment, the receive path 280 was partitioned so that the DC Estimation circuitry 282 was in the RF Circuitry 200. This results in RFBus1, during the receive mode, transferring RxData from the RF Circuitry 200 to the BB circuitry 100 across interface 10 and RFBus2 transferring a control signal, DcTrack, from the BB circuitry 100 to RF Circuitry 200 across interface 10. This partitioning of the receive path is not essential.

In a second contemplated embodiment, the DC Estimation circuitry 282 is located within the baseband circuitry 100. This results in RFBus2 having a different directional flow than described above in the receive mode. In the second embodiment, the DCTrack signal is wholly within the baseband circuitry 100 and is not provided at the interface 10. The analog output of the demodulator 284 is converted to a digital signal for example by a sigma-delta converter whose outputs are mapped to RFBus1 and RFBus2. Consequently, in this embodiment, data flows on both RFBus1 and RFBus2 from the RF circuitry 200 to the baseband circuitry 100 via interface 10 during the receive mode.

It is further contemplated that RF circuitry as described in the first embodiment may have additional circuitry which allows its functionality to be changed to operate in accordance with the second embodiment.

It is further contemplated that BB circuitry as described in the first embodiment may have additional circuitry which allows its functionality to be changed to operate in accordance with the second embodiment.

The present invention includes any novel feature or combination of features disclosed herein either explicitly or implicitly or any generalization thereof.

In view of the foregoing description it will be evident to a person skilled in the art that various modifications may be made to the foregoing description without departing from the scope of the invention.

What is claimed is:

1. A device having an interface for controlling radio frequency transceiver circuitry, the interface comprising:
    a plurality of connectors for controlling the radio frequency transceiver circuitry including providing control information for changing the mode of operation of the transceiver, said modes including a transmit mode and a receive mode;
    a first connector and a second connector, wherein in a first mode, one of said first connector and said second connector supplies data to the transceiver and the other connector of said first connector and said second connector is operable to perform a first function and wherein, in a second mode, one of said first connector and said second connector receives data from said radio frequency module and the other connector of said first connector and said connector is operable to perform a second different function.

2. A device as claimed in claim 1 wherein said first function is the provision of a first control signal to the transceiver.

3. A device as claimed in claim 2 wherein the first control signal is a time critical control signal.

4. A device as claimed in claim 1 wherein the first function is controlling a power amplifier of a transmitter portion of the transceiver.

5. A device as claimed in claim 1 wherein said second function is the provision of a second control signal to the transceiver.

6. A device as claimed in claim 5 wherein the second control signal is a time critical control signal.

7. A device as claimed in claim 1 wherein the second function is controlling dc estimation of data received by a receiving portion of the transceiver.

8. A device as claimed in claim 1 wherein said second function is reception of data from the transceiver.

9. A device as claimed in claim 1 wherein the first connector is bi-directional and supplies data in the first mode and receives data in the second mode.

10. A device as claimed in claim 1 wherein predetermined time critical control signals are not provided via said plurality of connectors.

11. A device as claimed in claim 1 wherein the first mode is the transmit mode for the transceiver.

12. A device as claimed in claim 1 wherein the second mode is the receive mode of the transceiver.

13. A device as claimed in claim 1 wherein the plurality of connectors includes a connector for transferring data to and from the device, a connector for providing an enable signal from the device and a connector for providing a clock signal from the device.

14. A device as claimed in claim 1 wherein the plurality of connectors are used to read from and write to registers in the transceiver.

15. A device as claimed in claim 1 wherein the plurality of connectors are a serial interface having at least one connector via which data is transmitted serially, said data including a device address, a bit indicating whether data is for writing or is to be read, a local address and a variable data portion.

16. A device as claimed in claim 1, further comprising first control circuitry and a processor, wherein the first control circuitry is arranged to control the radio frequency circuitry via the plurality of connectors and/or the first and second further connectors and the processor is arranged to control the radio frequency circuitry only via the plurality of connectors.

17. A device as claimed in claim 15 wherein the data portion varies between 1 and 32 bits.

18. A device as claimed in claim 1 wherein the plurality of connectors are coupled to at least one other device.

19. A device as claimed in claim 1 comprising a connector for receiving a clock signal from the transceiver.

20. A device as claimed in claim 1 comprising a third connector for powering down components of the transceiver.

21. Transceiver circuitry having an interface for connection to a device having baseband circuitry, the interface comprising:
   a plurality of connectors for providing control information for changing the mode of operation of the transceiver, said modes including a transmit mode and a receive mode;
   a first connector and a second connector, wherein in a first mode, data is received at one of said first connector and said second connector and the other connector of said first connector and said second connector performs a first function and wherein, in a second mode, data is provided at one of said first connector and said second connector for transfer to the device and the other connector of said first connector and said second connector performs a second function different from the first function.

22. Transceiver circuitry as claimed in claim 21 comprising a power amplifier, wherein the first function is the reception of a first control signal for controlling the power amplifier.

23. Transceiver circuitry as claimed in claim 21 comprising DC estimation circuitry wherein the second function is the reception of a second different control signal for controlling the dc estimation circuitry.

24. Transceiver circuitry as claimed in claim 21 or 22 wherein the second function is the provision of received data.

* * * * *